US007779699B2

(12) United States Patent
Kurtz et al.

(10) Patent No.: US 7,779,699 B2

(45) Date of Patent: Aug. 24, 2010

(54) APPARATUS FOR MEASURING MULTIPLE PRESSURES WITHIN DIFFERENT PRESSURE RANGES

(75) Inventors: Anthony D. Kurtz, Saddle River, NJ (US); Robert Gardner, Westwood, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/319,855

(22) Filed: Jan. 13, 2009

(65) Prior Publication Data

US 2010/0175481 A1 Jul. 15, 2010

(51) Int. Cl.
*G01L 13/02* (2006.01)

(52) U.S. Cl. ........................................................ 73/716

(58) Field of Classification Search .................. 73/716, 73/36; 361/283.1–283.4

See application file for complete search history.

(56) References Cited

U.S. PATENT DOCUMENTS

| | | | | |
|---|---|---|---|---|
| 4,160,600 | A * | 7/1979 | Luke | 356/506 |
| 4,212,191 | A * | 7/1980 | Ethridge | 73/861.47 |
| 4,445,383 | A | 5/1984 | Binder et al. | |
| 5,614,678 | A | 3/1997 | Kurtz et al. | |
| 5,702,619 | A | 12/1997 | Kurtz et al. | |
| 6,401,541 | B1 * | 6/2002 | Kurtz | 73/716 |
| 6,577,224 | B2 | 6/2003 | Kurtz | |
| 2008/0016966 | A1 | 1/2008 | Jacobsen | |

FOREIGN PATENT DOCUMENTS

| | | |
|---|---|---|
| JP | 62250322 | 10/1987 |
| WO | 2008133927 | 11/2008 |

OTHER PUBLICATIONS

International Search Report and Written Opinion issued by the Australian Patent Office dated Apr. 8, 2010 for related PCT Application No. PCT/US2010/020915.

* cited by examiner

*Primary Examiner*—Jewel Thompson
(74) *Attorney, Agent, or Firm*—Troutman Sanders LLP; James E. Schutz; Dean Y. Shahriari

(57) ABSTRACT

There is disclosed an apparatus for measuring multiple pressures within different pressure ranges. The apparatus contains multiple pressure sensors which are positioned on a housing, where each pressure sensor is adapted to measure pressure within a different pressure range. The housing has an input port which is constructed to communicate with different output ports, where the output ports communicate with each different pressure sensor utilized in a different pressure range. The input port has a stepped or keyed aperture which is adapted to receive different pressure adapters. The input port enables the selective insertion of various pressure adapter members as indicated where each pressure adapter member can only be inserted within the input port to a desired position, where at that position, the pressure applied to the input port will be directed to the proper pressure sensor.

10 Claims, 1 Drawing Sheet

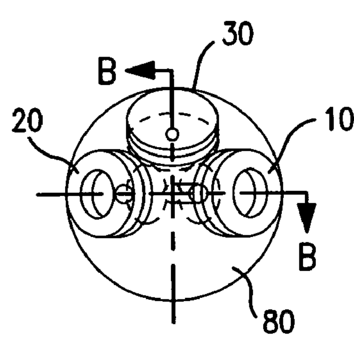
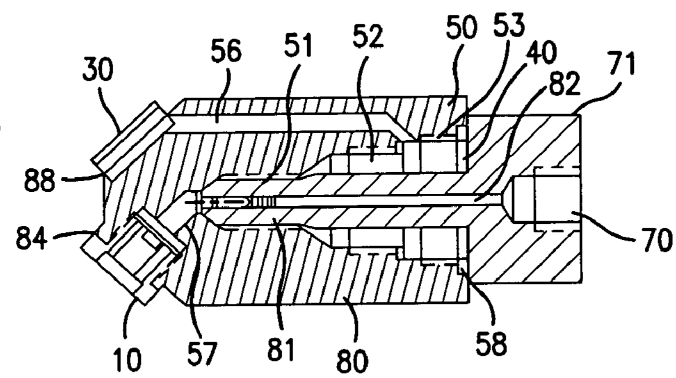
FIG. 1A
FIG. 1B
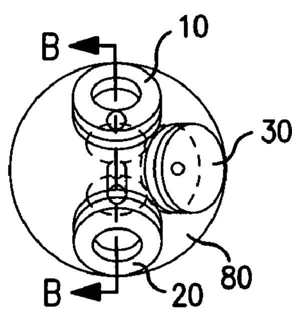
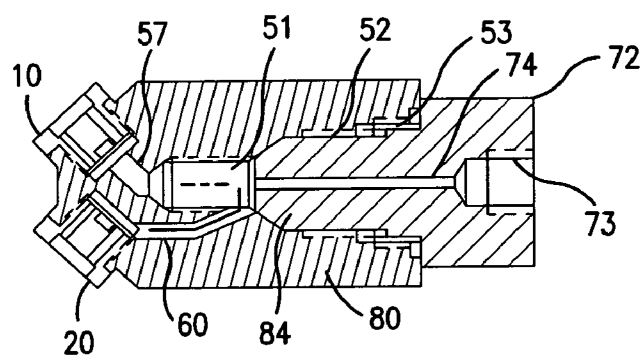
FIG. 2A
FIG. 2B
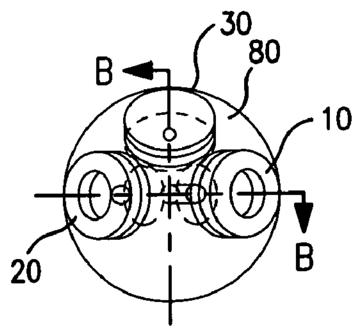
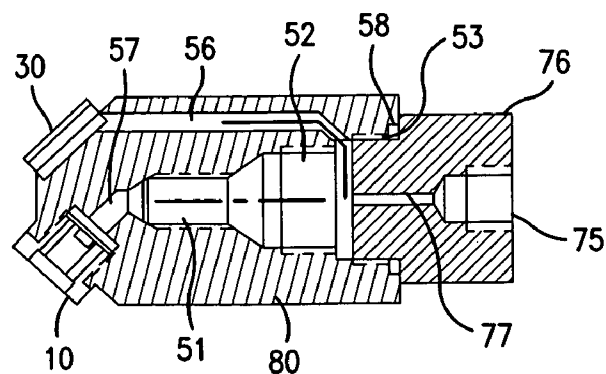
FIG. 3A
FIG. 3B

APPARATUS FOR MEASURING MULTIPLE PRESSURES WITHIN DIFFERENT PRESSURE RANGES

FIELD OF THE INVENTION

This invention relates to pressure measurements and more particularly to apparatus capable of measuring pressures within different pressure ranges.

BACKGROUND OF THE INVENTION

The art of pressure transducers has been vastly improved and there are pressure transducers available which measure pressure in multiple ranges. In any event, pressure measurements can vary according to different pressure ranges. In this manner, low pressures, for example, pressures of 0+ psi to 20 psi or more are measured by utilizing pressure transducers which have relatively thin diaphragms and are accurate in a sense that at low pressures, one obtains accurate measurements. There are pressures in the mid pressure range, for example, which pressures exceed 20 psi and so on, and transducers have been fabricated particularly for pressures within the mid pressure range. High pressures also require completely different transducers which are fabricated, for example, to withstand pressures in extremely high ranges such as pressures of 30,000 psi or greater. There are also pressure transducers which are capable of measuring ultra high pressures, such as pressures which approach 75,000 psi or greater. Thus as one can ascertain from the prior art, there are a number of transducers which respond to pressures in different ranges, such as low pressure, mid-range pressure, high pressure and ultra high pressure. Pursuant to this, there are many uses which require multiple pressure measurements. In this manner, for example, a manufacture or user of an aircraft or in automotive applications or other applications such as combustion engines, turbines and so on, one requires multiple pressures to be measured. These pressures can vary from low to medium to high to ultra high pressures. As indicated in the prior art, there are different transducers that are necessary to measure such pressures. As one can easily ascertain, a transducer which is made to respond to low pressure would be destroyed if one applied a high pressure or a medium pressure to such a device. In a similar manner, the high pressure transducers and mid-range pressure transducers while not being disturbed by the application of a low pressure thereto, would not produce a very reliable output. Such multiple pressure measurements have been implemented and used by the military, aerospace industry and other industries as well. Therefore, in order to accommodate multiple pressure measurements within different pressure ranges, one requires multiple transducers. This provides for extreme problems in the field. The problems result in the fact that multiple transducers, while available, require a user to have such transducers immediately at hand, and each time a different pressure range is to be measured, one requires a different transducer. This is both expensive and complicated and therefore requires a user to constantly change transducers as by removing one transducer and inserting another transducer in regard to different pressure range measurements and so on. It is therefore an object of the present invention to provide apparatus which will contain multiple pressure transducers, each transducer corresponding to a different pressure range, all coupled to a single input port. The input port has various diameters which accompany the output ports of the pressure ranges to be measured. For example, the input port of the apparatus can accommodate a low pressure input, a mid section pressure input, a high pressure input, as well as pressures in other ranges. All these inputs utilize different size pressure ports so that a user would not, for example, confuse a high pressure output port with a low pressure output port. The output ports, as will be explained, are different of diameters, all of which can be accommodated by adapters which are coupled to the input port of the apparatus and which adapters will accommodate a low, mid or high pressure inputs.

SUMMARY OF THE INVENTION

An apparatus capable of measuring multiple pressures within different pressure ranges, comprising a housing having located thereon a plurality of pressure sensors, each adapted to measure pressures within a different pressure range associated with each sensor, said housing having a pressure inlet port communicating with a keyed passageway, with said passageway communicating with pressure output ports, each separate one communicating with a separate associated sensor, a plurality of inlet pressure adapters, each associated with a different pressure range with each adapter dimensioned to be inserted into said keyed passageway at a position according to the shape of said adapter as determined by said keyed passageway, wherein when a high pressure measurement is selected by the insertion of the associated adapter, all lower pressure output ports are blocked to prevent lower pressure range sensors from receiving said higher pressure whereby said higher pressure is applied only to said high pressure ports.

BRIEF DESCRIPTION OF THE DRAWINGS

FIG. 1A shows a front view of a pressure transducer assembly according to this invention. FIG. 1B depicts a cross-sectional view of the transducer of FIG. 1A which contains an adapter for high pressure input measurements.

FIG. 2 consists of FIG. 2A which is again a front view of the pressure apparatus according to this invention. While FIG. 2B is a cross-sectional view of FIG. 2A showing a mid-range pressure adapter according to this invention.

FIG. 3 consists of FIG. 3A which again is a front view of the pressure measurement apparatus according to this invention. While FIG. 3B is a cross-sectional view taken through lines B-B of FIG. 3A showing an adapter for low pressure measurements according to this invention.

DETAILED DESCRIPTION OF THE INVENTION

Referring to FIG. 1, which consists of FIG. 1A and FIG. 1B, there is shown a housing according to this invention. The housing 80 contains three pressure transducers, such as low pressure transducer or sensor 30, a high pressure sensor 10 and a medium or mid-range pressure sensor 20. As indicated and as is known, such pressure sensors for low pressure, mid-range pressure and high pressure are configured quite differently as indicated and shown in the prior art. Thus as one can see from FIG. 1, the housing 80 contains a low, mid-range and high range pressure sensor. The housing 80 has openings such as 88 for the low pressure sensor 30 and 89 for the high pressure sensor 10. The housings of the sensors can be welded or otherwise secured to and located within the opening in the housing 80. While the housing 80 contains three pressure sensors it is understood that more or less can be employed. The housing 80, shown in cross-sectional view in FIG. 1B, essentially has the transducers arranged as shown in FIG. 1A. Based on the cross-sectional view of FIG. 1B, the housing 80 contains a stepped or keyed input port or aperture 40. The input port 40 has a first input section 51 of a given diameter, which is contiguous with a second larger diameter section 52 which again, is contiguous with a third larger diameter section 53. The varying diameter sections 51, 52 and 53 are adapted to receive different adapter members, such as adapter member 71. Adapter member 71 is high pressure inlet adapter and essentially, the adapter has an extending front portion 81 which operates as a mating diameter with section 51 of the input port 40 in housing 80. The adapter 71 has a channel 82 which extends to input port 57 associated with the high pressure sensor 10. The channel 82 is coupled to an input port 70, which input port 70 has a thread adapted to receive a high pressure connection. The input port 70 receives a high pressure connection via channel 82 which directly communicates with channel 57 so that high pressure is applied to channel 57 and hence to the high pressure sensor 10. It is seen from FIG. 1, that when adapter 71 is inserted into the keyed aperture 40, the extending front section 81 is directed into the front aperture section 51. The adapter 71, which is the high pressure inlet adapter, has a gasket 58, which gasket may also be about the input aperture of the housing 80. In this manner, the high pressure applied to input 70 is directed through channel 82 and then channel 57 into the high pressure input. It is seen that the low pressure sensor which has an input channel 56 cannot receive the high pressure, as the high pressure is totally blocked because of the insert or inlet adapter 71. The inlet adapter 71 does not allow pressure to be applied to the low or medium pressure sensor. Therefore, the low pressure sensor is totally protected.

Referring to FIG. 2, there is shown the housing 80 again in FIG. 2B in cross-section which essentially corresponds to the section B-B taken through FIG. 2A. As one can see, there is now a different adapter 72 which is a mid-range pressure inlet adapter. The adapter 72 has an input port 73 which communicates with channel 74. Channel 74, as seen, is directed into the input front section 51 and communicates with both the mid-range sensor 20 and the high pressure sensor 10. The mid-range pressure sensor 20 receives the input pressure applied via input port 73 and directed into channel 74 via the input channel 60. The high pressure sensor also receives the mid-range pressure via channel 57. It is of course understood that the high pressure sensor cannot be damaged during measurement of pressures in the mid range. Thus as shown in FIG. 2, the adapter 72, which has an extending front section 84, is inserted so that it is stopped in section 52 of the input aperture of the housing 80. Thus the adapter 72 now allows mid-range and high pressure to be applied to sensors 10 and 20.

Referring to FIG. 3 there is shown in FIG. 3A the housing 80 together with the sensors 10, 20 and 30. In any event, as shown in FIG. 3, there is an adapter 76 which has an input port 75 and a corresponding channel 77. The channel 77 communicates with the channel 56 and the low pressure sensor 30 communicates with channel 57 in the high pressure sensor 10 and communicates with channel 60 associated with the mid-range pressure sensor. Thus the adapter 76 also has an input port 75 which is threaded to receive the low pressure at the input. The low pressure directed through channel 77 where low pressure is applied to all sensors as the high pressure sensor 10, the mid-range pressure sensor 20 and the low pressure sensor 30. This of course is totally permissible as the mid-range and high pressure sensors will not be affected by application of low pressure thereto. Thus as seen, one now has available the housing 80 plus a series of adapters 71 for high pressure, 72 for mid-range pressure and 76 for low pressure. The housing 80, as indicated, contains multiple pressure sensors for measurement of multiple pressure ranges. While it is shown in FIGS. 1, 2 and 3 that the housing has three different pressure range sensors, it is of course possible to add more than three by added additional cone threaded sizes, as shown in FIGS. 1, 2 and 3. It is of course easily ascertainable that the housing 80 may contain only two pressure sensors instead of three or more. In any event, as indicated above, pressure sensors are fabricated very differently according to the pressure ranges to be measured.

As one can ascertain, the applicant herein, namely Kulite Semiconductor Products, Inc., has many patents which show transducers or sensors suitable for measuring different pressures. See for example, U.S. Pat. No. 5,614,678 entitled High Pressure Piezoresistive Transducer issued on Mar. 25, 1997 to A. D. Kurtz, et al. That patent discusses pressures, as for example, low pressure devices which measure pressures less than 100 psi and higher pressure devices which can measure extremely high pressures which are greater than 2000 psi. See also U.S. Pat. No. 5,702,619 issued on Dec. 30, 1997 and entitled Method for Fabricating a High Pressure Piezoresistive Transducer issued to Anthony D. Kurtz and assigned to the assignee herein. That patent also describes pressure ranges and the need for different characteristics in regard to such transducers. See also U.S. Pat. No. 6,577,224 issued on Jun. 10, 2003 entitled Ultra High Pressure Transducers to A. D. Kurtz. That patent discusses transducers which are capable of measuring ultra high pressures, as for example, pressures of above 70,000 psi. The patent also describes mid-range pressures and other lower pressures for example less than 50,000 psi and so on. As one can ascertain from the above noted Patents, such pressure sensors, as for example, pressure sensor 10, 20 and 30 depicted in FIG. 1, contain piezoresistive sensors, which piezoresistor sensors change resistance according to an applied pressure. Such devices are normally fabricated in conjunction with semiconductor diaphragms of various thicknesses based on the pressure to be measured. Also, such sensors may be associated with metal diaphragms which apply a pressure to a silicon sensor via a pressure transmitting fluid such as oil. Such oil filled transducers are also well known in the art and for example can be employed in this invention as the high pressure transducer. It should therefore be apparent that the above noted housing 80 together with the various adapters enables multiple pressure ranges to be measured with the use of the single housing incorporating and adapted to receive the various adapter members for measurement of low, mid-range and high range pressures. This therefore enables the user to have one housing as housing 80 which contains multiple sensors or transducers capable of measuring multiple pressure ranges. It should therefore be apparent to those skilled in the art that there are many modifications and alterations that can be implemented using this invention and all such alternative embodiments are deemed to be encompassed within the claims appended hereto.

What is claimed is:

1. An apparatus for measuring multiple pressures within different pressure ranges, comprising:

a housing having located thereon a plurality of pressure sensors, each adapted to measure pressures within a different pressure range associated with each sensor, said housing having a pressure inlet port communicating with a keyed passageway, with said passageway communicating with pressure output ports, each separate one communicating with a separate associated sensor, a plurality of inlet pressure adapters, each associated with a different pressure range with each adapter dimensioned to be inserted into said keyed passageway at a position according to the shape of said adapter as determined by said keyed passageway, wherein when a high pressure measurement is selected by the insertion of the associated adapter, all lower pressure output ports are blocked to prevent lower pressure range sensors from receiving said higher pressure whereby said higher pressure is applied only to said high pressure ports.

2. The apparatus according to claim 1 wherein said pressure sensors include a high pressure sensor, a mid-range pressure sensor and a low range pressure sensor.

3. The apparatus according to claim 2 wherein said keyed passageway has a front section of a given diameter with said front section communicating with a high pressure input port directed to said high pressure sensor, said front portion contiguous with a larger diameter central portion with said central portion communicating with a mid-range pressure port directed to said mid-range sensor, said central portion contiguous with an end portion of a larger diameter than said central portion, with said end portion communicating with a low range pressure port directed to said low range pressure sensor.

4. The apparatus according to claim 3 further including:

a high pressure adapter having a front end extending portion dimensioned to enable insertion into said keyed passageway to be located within said front section of said passageway, said adapter having a pressure channel extending there through from said front to a second back end, to enable high pressure to be applied to said second back end and therefore to said front end and said high pressure inlet port.

5. The apparatus according to claim 3 including:

a mid-range pressure adapter having a front end portion extending into and located only at said central portion of said passageway when inserted in said passageway said adapter having a channel extending from said front end to said back end, to enable a mid-range pressure port and via said front section to said high pressure inlet port.

6. The apparatus according to claim 3 further including:

a low range pressure adapter having a front end portion adapted to be inserted into said keyed passageway to locates said front end portion at said end portion of said passageway, said adapter having a pressure channel directed from said front end to a back end to apply a low pressure to said back end to enable said low pressure to be applied to said low range pressure port.

7. The apparatus according to claim 6 wherein said low pressure is also applied to said mid-range pressure port.

8. The apparatus according to claim 6 wherein said low pressure is also applied to said high range pressure port.

9. The apparatus according to claim 1 wherein said housing is cylindrical.

10. The apparatus according to claim 1 wherein said pressure inlet port is surrounded by a gasket.

* * * * *